(12) United States Patent
Wang

(10) Patent No.: US 6,776,458 B1
(45) Date of Patent: Aug. 17, 2004

(54) WHEEL COVER WITH LIGHT EMITTING MECHANISM

(76) Inventor: Hung-Sheng Wang, No. 29, Lane 766, Sec. 1, Jungjeng Rd., Rende Shiang, Tainan (TW)

( * ) Notice: Subject to any disclaimer, the term of this patent is extended or adjusted under 35 U.S.C. 154(b) by 0 days.

(21) Appl. No.: 10/457,415

(22) Filed: Jun. 10, 2003

(51) Int. Cl.[7] ................................................. B60B 7/00
(52) U.S. Cl. .............................. 301/37.105; 301/108.1; 362/500; 362/35
(58) Field of Search .......................... 301/37.22, 5.301, 301/37.42, 37.102, 37.1, 37.105, 108.1, 37.35, 37.36, 37.103, 37.37, 37.373, 37.374, 37.375, 37.376, 37.23, 37.32, 37.34, 37.107; 362/500, 551, 469, 184, 464, 276, 249, 802

(56) References Cited

U.S. PATENT DOCUMENTS 5,876,108 A * 3/1999 Chien ........................... 362/35
6,485,169 B1 * 11/2002 Ragner ......................... 362/500
6,572,251 B1 * 6/2003 Huang .......................... 362/500
6,644,839 B2 * 11/2003 Lee ............................ 362/500

* cited by examiner

Primary Examiner—Frantz F. Jules
(74) Attorney, Agent, or Firm—Rosenberg, Klein & Lee

(57) ABSTRACT

A wheel cover of an automobile is formed with several holding holes on an outward side thereof, and has light emitting members fixedly disposed in respective holding holes; each light emitting member consists of a circuit board, an electricity-activated light emitting element connected to an outward side of the circuit board, cells, and a vibration-activated switch fitted to the circuit board, which can make the light emitting element activated with the cells when making circular movement; thus, light can be emitted from the light emitting members when an automobile equipped with the wheel cover is driven, and in turns, lateral sides of the automobile can be easily noticed by other people.

5 Claims, 7 Drawing Sheets

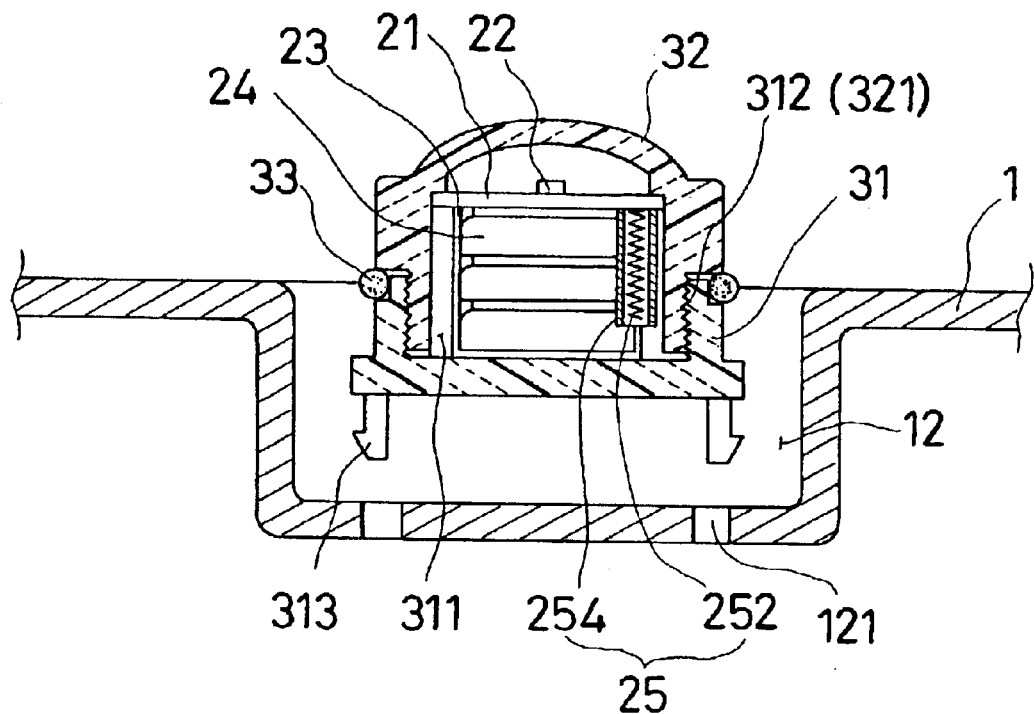
F I G. 4
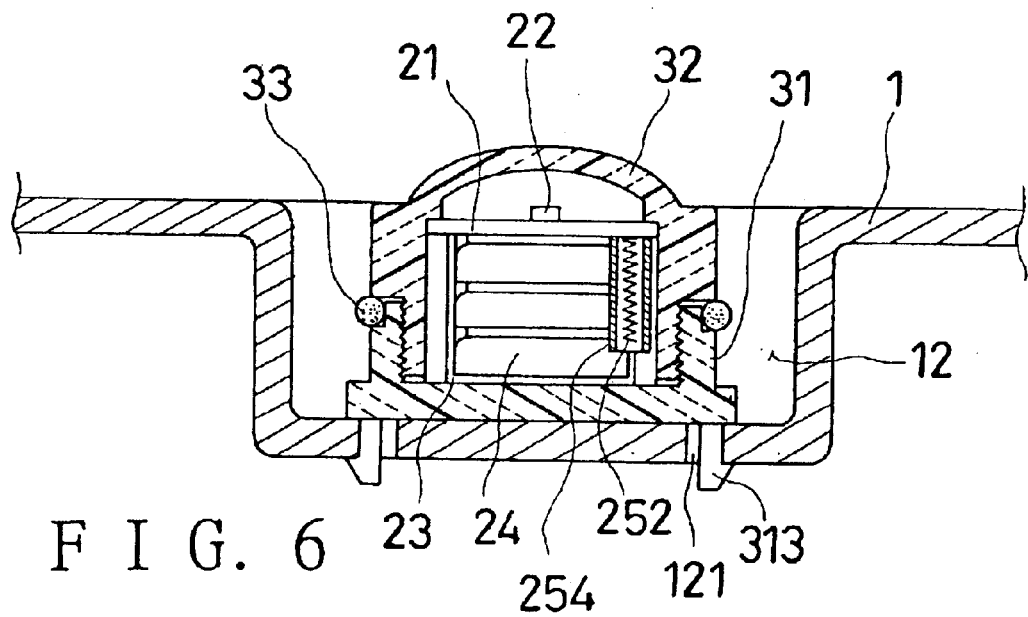
F I G. 6

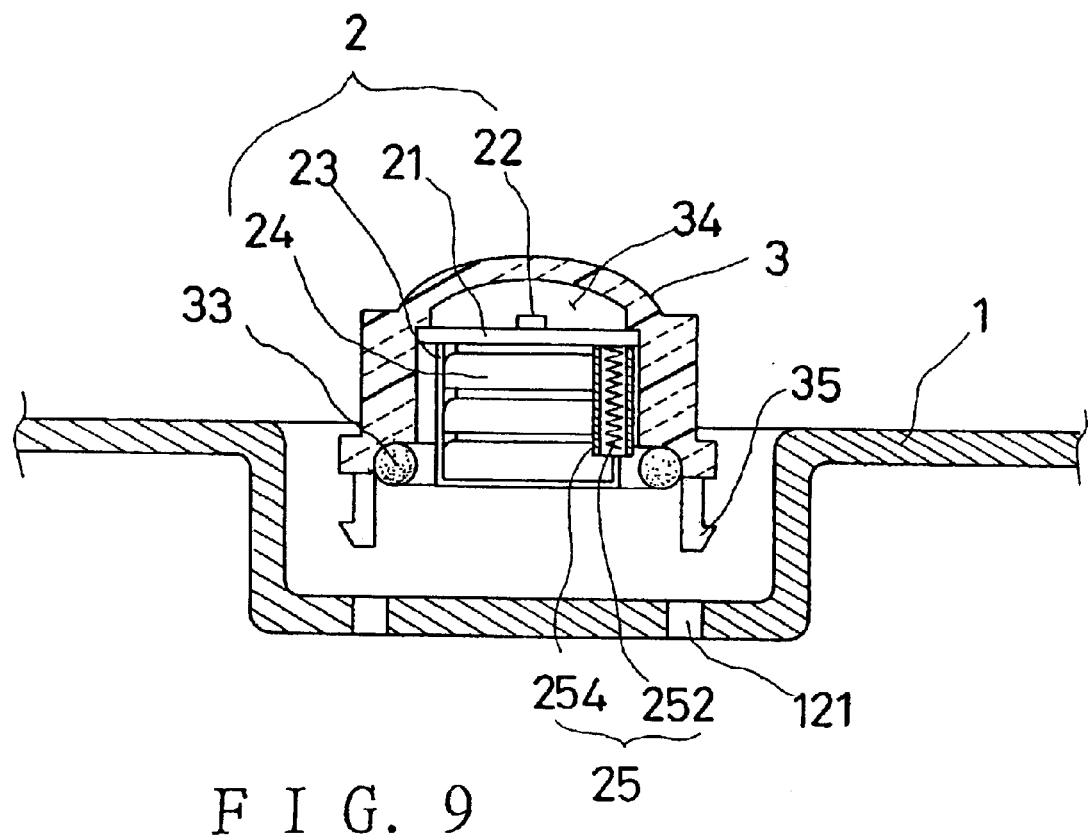
F I G. 9
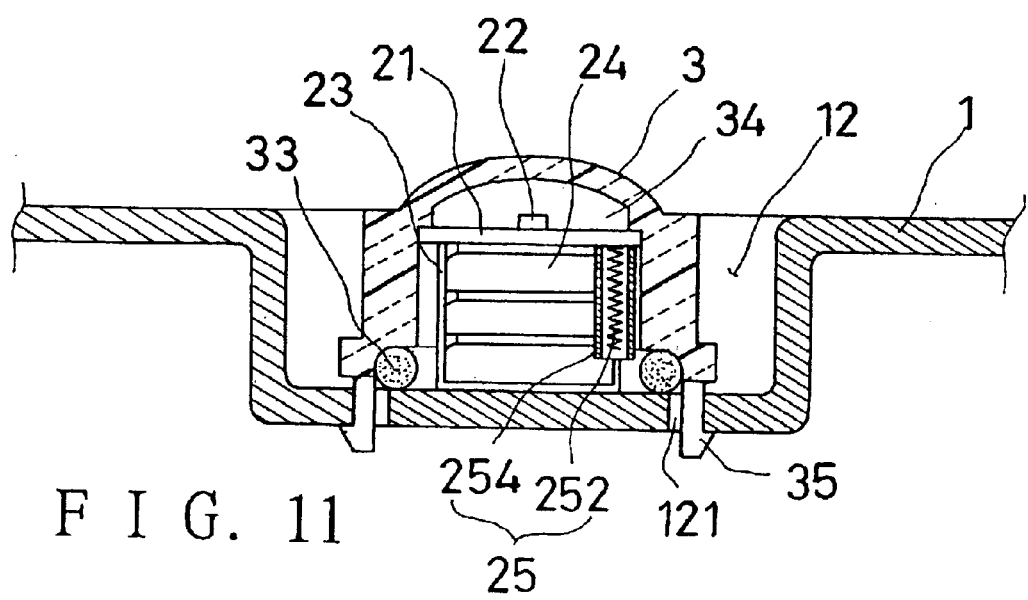
F I G. 11

WHEEL COVER WITH LIGHT EMITTING MECHANISM

BACKGROUND OF THE INVENTION

1. Field of the Invention

The present invention relates to a wheel cover, more particularly one, which is equipped with light emitting elements capable of being activated to emit light to make the same more attractive and easily noticeable when an automobile equipped with the wheel cover is being driven.

2. Brief Description of the Prior Art

Automobiles are very important is modem living, and provide a lot of convenience and functions to people, such as protecting the passengers from wind, rain etc. Wheels and tires are important parts of automobiles, and are made to provide the passengers with as comfortable and smooth ride as possible. The industry has also been putting a lot of efforts into making wheels attractive and pleasant to look at. Wheels usually have wheel covers fitted to outward sides thereof so that it is decorated with patterns of the wheel covers, and relatively unpleasant-looking portions thereof covered.

Conventionally, wheel covers have a middle portion, several portions extending from the middle portion with a radial pattern, hollows between the radially arranged portions, and a circular edge at the outer end of the radial portions. And, there have been a lot of different designs made available for wheel covers by the industry after the first automobile was available, with the purpose to provide people with more attractive wheel covers. However, it is getting more and more difficult to develop new designs and patterns for wheel covers because many excellent designs and patterns have been made over the years.

Furthermore, major front and rear lamps of automobiles emit most of the light towards front and back of the automobiles while lateral sides of automobiles are not equipped with enough light emitting mechanism to notice other people or drivers. And, a large proportion of car accidents happen wherein one car hits the lateral side of another car.

SUMMARY OF THE INVENTION

It is a main object of the present invention to provide a wheel cover with light emitting elements, which can be activated when the wheel cover is rotating, such that the wheel cover can be more attractive and easily noticeable, and lateral sides of the automobile can be easily noticed, providing automobile drivers with more safety.

The wheel cover is formed with several holding holes on an outward side, and has light emitting members, which are held in transparent housings, fixedly disposed in respective holding holes; each light emitting member consists of a circuit board, a light emitting element connected to the circuit board, cells, and a vibration-activated switch fitted to the circuit board. The vibration-activated switches can make the light emitting elements activated with the cells when making circular movement; thus, light can be emitted from the light emitting members when an automobile equipped with the wheel cover is driven.

BRIEF DESCRIPTION OF THE DRAWINGS

The present invention will be better understood by referring to the accompanying drawings, wherein:

FIG. 4 is a partial cross-sectional view of the wheel cover of the second embodiment under assembly, FIG. 6 is a partial cross-sectional view of the wheel cover of the second embodiment after assembly, FIG. 9 is a partial cross-sectional view of the wheel cover of the fourth embodiment under assembly, FIG. 11 is a partial cross-sectional view of the wheel cover of the fourth embodiment after assembly.

DETAILED DESCRIPTION OF THE PREFERRED EMBODIMENTS

Figure 1:
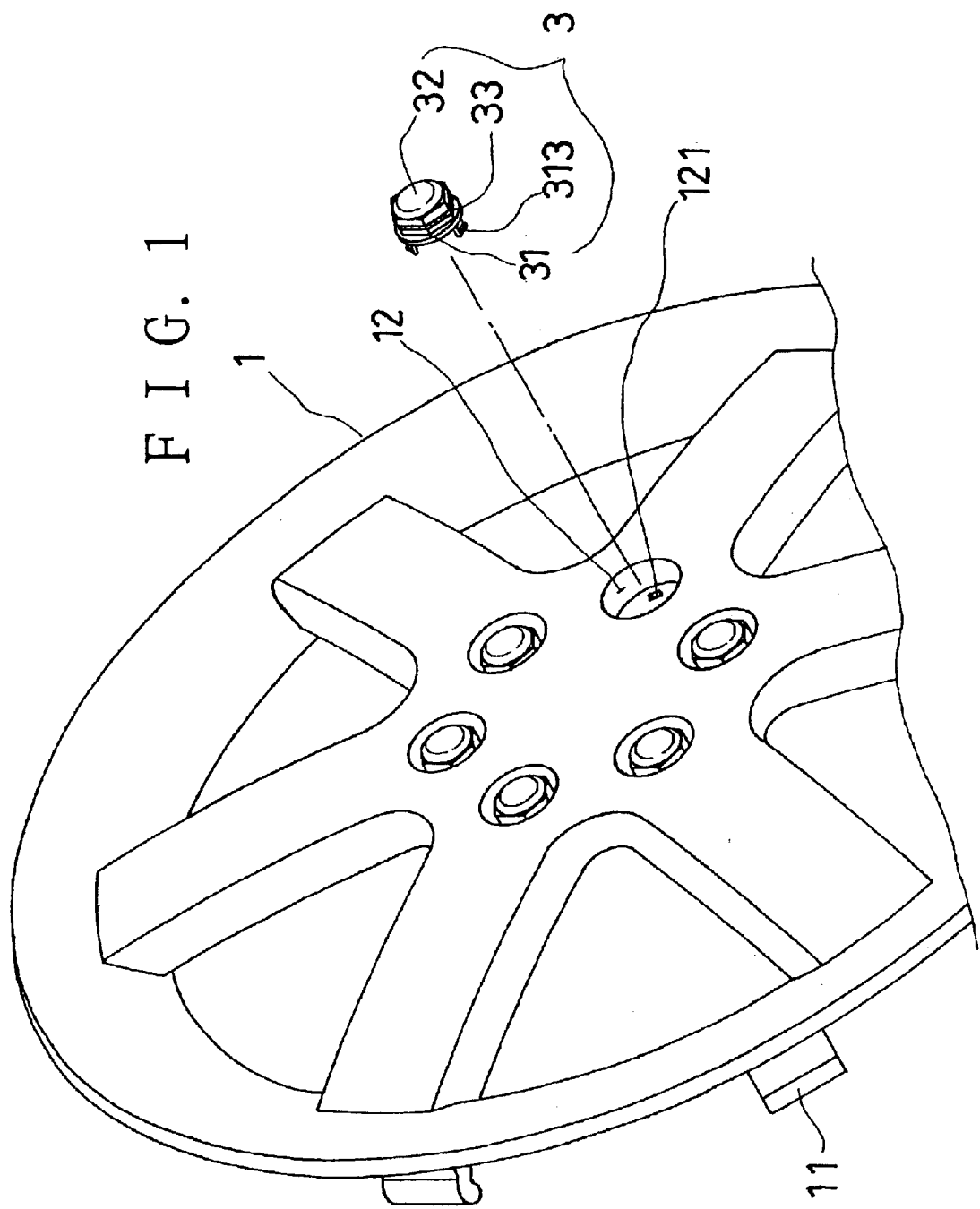
FIG. 1 is an exploded perspective view of the wheel cover according to the present invention.
Figure 2:
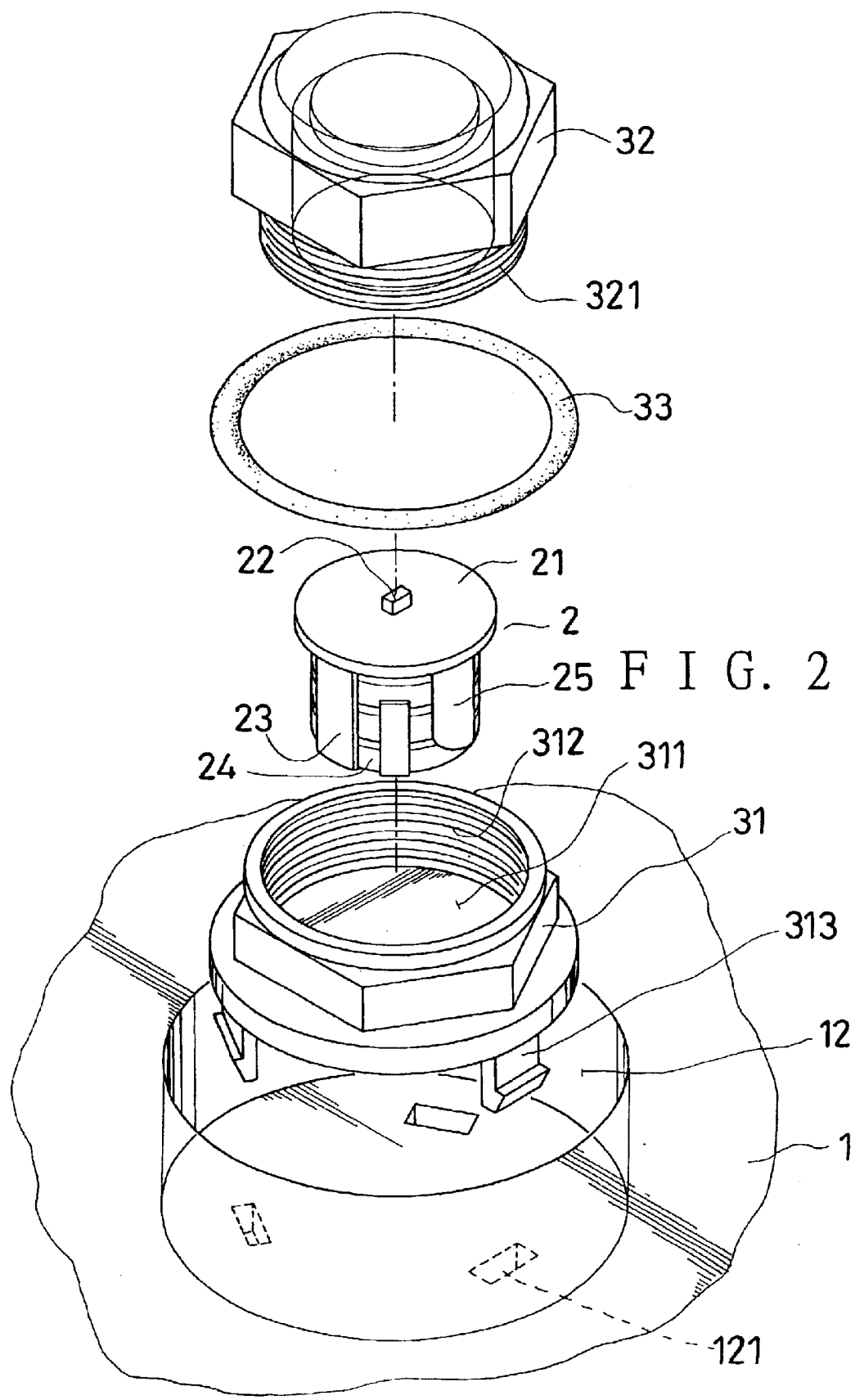
FIG. 2 is a partial exploded perspective view of the wheel cover according to the present invention.

Referring to FIGS. 1, and 2, a preferred embodiment of a wheel cover in the present invention includes a main body 1, several light emitting mechanisms 2, and housing 3 of light emitting mechanisms 2.

The main body 1 is formed with several locking projections 11 on the edge thereof, which can separably engage an engaging portion of a wheel (not shown) to secure the main body in position. The main body 1 has several holding holes 12 on an outward side thereof, and has through lock holes 121 extending from each holding hole 12 to an inward side thereof.

Figure 3:
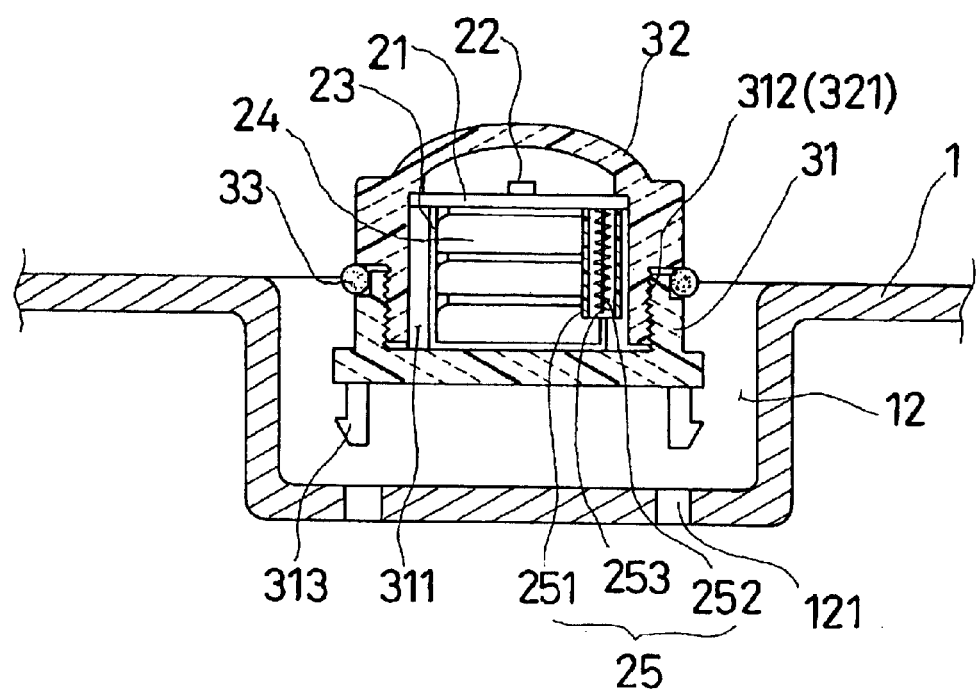
FIG. 3 is a partial cross-sectional view of the wheel cover according to the present invention under assembly.
Figure 5:
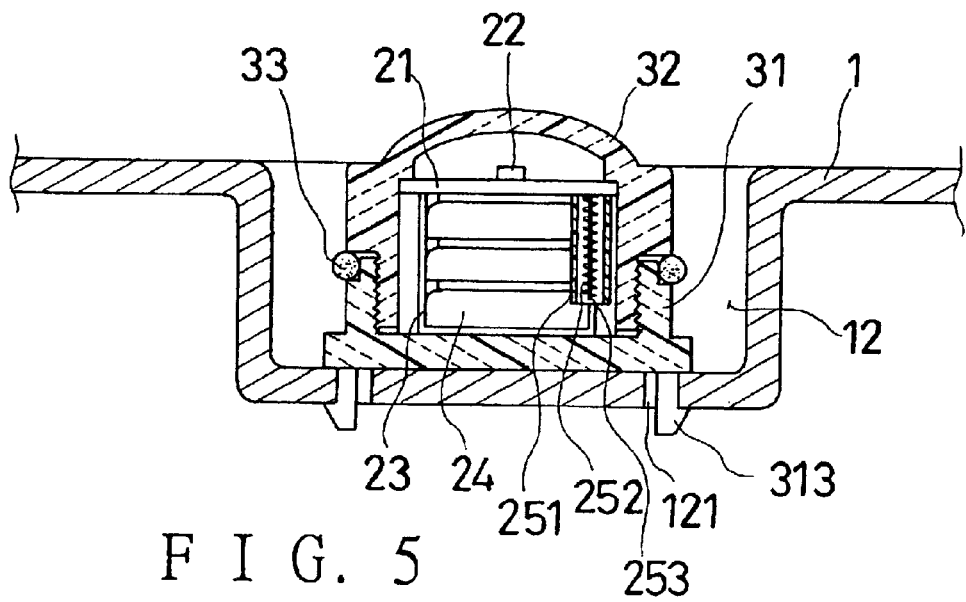
FIG. 5 is a partial cross-sectional view of the wheel cover according to the present invention after assembly.
Figure 7:
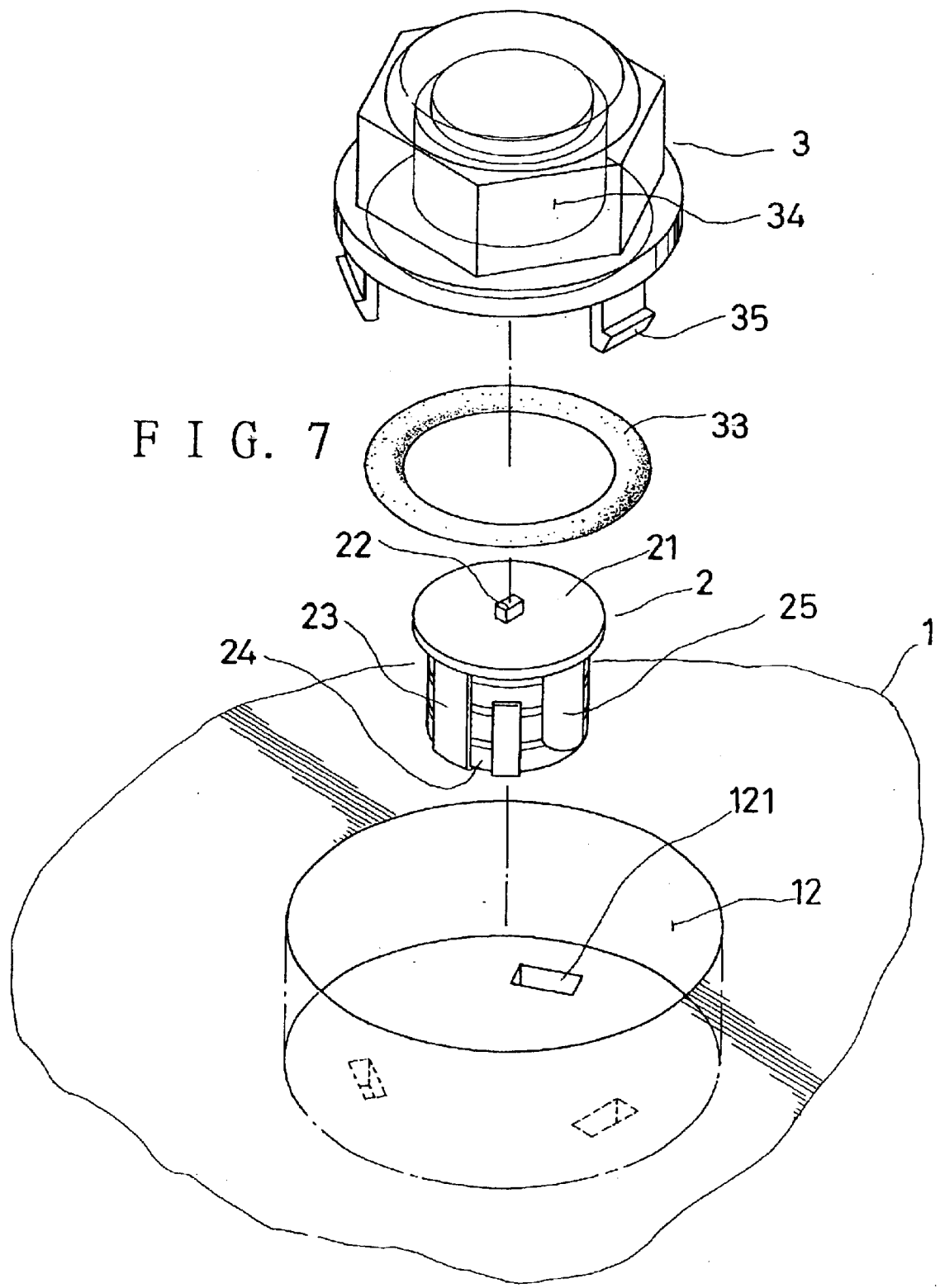
FIG. 7 is partial exploded perspective view of the wheel cover of the third embodiment.

Each light emitting mechanism 2 consists of a circuit board 21, a light emitting element 22 connected to an outward side of the circuit board 21, a conducting plate 23 joined to, and projecting from, an inward side of the board 21, battery cells 24 in contact with both the conducting plate 23 and the board 21, and a vibration-activated switch 25 fitted to the circuit board 21; the light emitting elements 22 can be activated to emit light with electricity. Referring to FIG. 3, each vibration-activated switch 25 is comprised of an insulating tube 251, a metallic elastic unit 252 arranged in and along the insulating tube 251, and a metallic conducting rod 253 arranged in and along the unit 252; thus, when the car is driven, the switch 25 will make circular movement together with the wheel, and in turns, the elastic unit 252 vibrates to come into contact with the conducting rod 253 to close the circuit of the light emitting mechanism 2 to make the light emitting element 22 activated with the cells 24.

Referring to FIG. 4, each vibration-activated switch 25 in the second embodiment is comprised of a metallic tube 254, and a metallic elastic unit 252 arranged in and along the metallic tube 254; when the car is driven, the elastic unit 252 will vibrate to come into contact with the metallic tube 254 to make the light emitting element 22 activated with the cells 24.

Referring to FIGS. 2 to 6, each housing 3 consists of a base part 31, and a covering part 32; the base part 31 has a holding room 311, screw threads 312 on an inner side, and several locking hooks 313 projecting from an inward end thereof; the covering part 32 is transparent, and is formed with screw threads 321 on an outer side.

In combination, each light emitting element 2 is disposed in holding room 311 of one base part 31, and ring-shaped pads 33 are passed around the covering parts 32, and the covering parts 32 are screwed to respective base parts 31 with the ring-shaped pads 33 being held in between. Then, the base parts 31 are disposed in respective holding holes 12 of the main body 1 of wheel cover with the locking hooks 313 being passed through the lock holes 121, and hooked onto the inward side of the main body 1. Thus, the light emitting mechanisms 2 are securely joined to the main body 1 of wheel cover.

Figure 8:
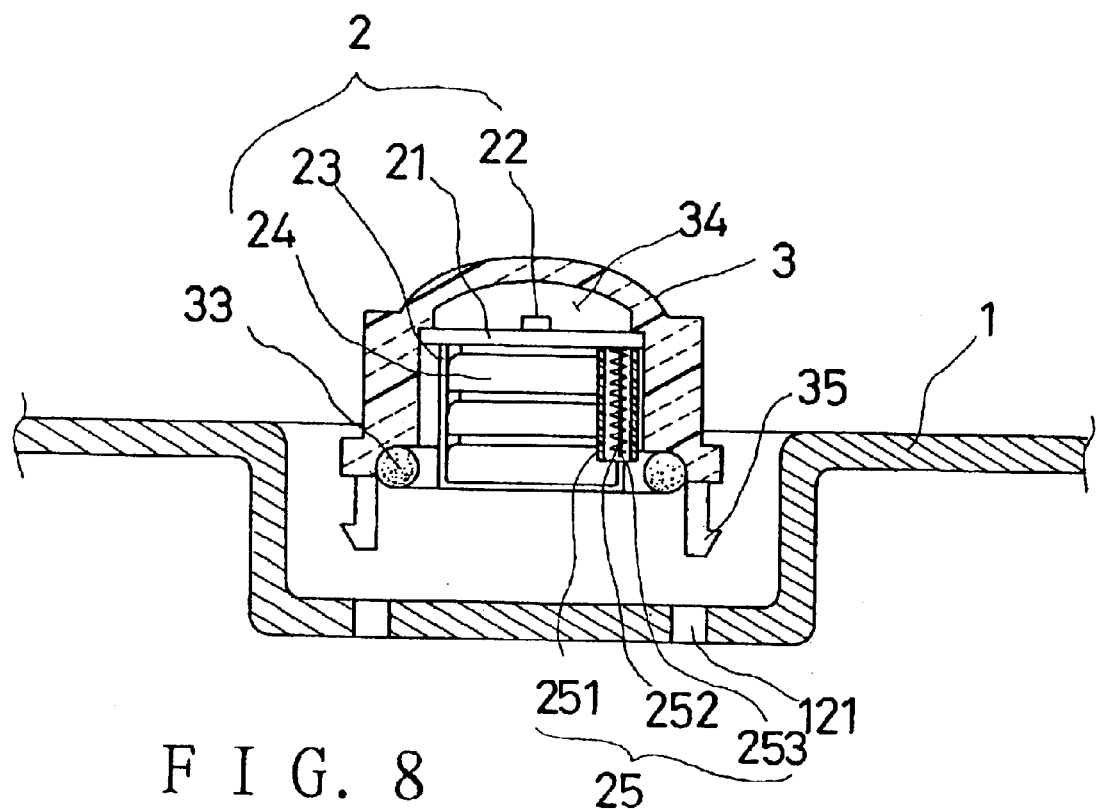
FIG. 8 is a partial cross-sectional view of the wheel cover of the third embodiment under assembly.
Figure 10:
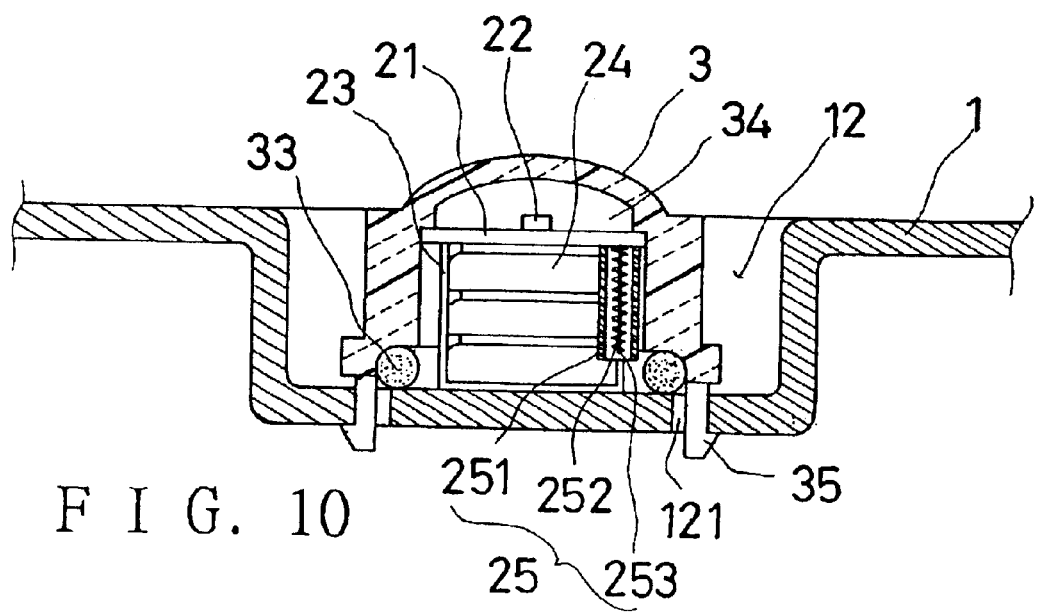
FIG. 10 is a partial cross-sectional view of the wheel cover of the third embodiment after assembly.

Referring to FIGS. 7 to 11, each housing 3 in the third embodiment is made of single part, which is transparent, and which is formed with several locking hooks 35 projecting from an inward end, and a holding room 34 for holding a light emitting mechanism 2 therein. In assembling the wheel cover, light emitting mechanisms 2 are held in holding rooms 34 of respective housings 3, and ring-shaped pads 33 are fitted to inward ends of the housings 3. Then, the housings 3 are disposed in respective holding holes 12 of the main body 1 of wheel cover, and securely joined to the main body 1 with the locking hooks 35 being passed through the lock holes 121, and hooked onto the inward side of the main body 1, and with the ring-shaped pads 33 being held between the housings 3 and the main body 1; the vibration-activated switches 25 can be in a form like the first embodiment, which consists of an insulating tube 251, a metallic elastic unit 252 arranged in and along the insulating tube 251, and a metallic conducting rod 253 arranged in and along the unit 252, as shown in FIGS. 8, and 10, or in a form like the second embodiment, which consists of a metallic tube 254, and a metallic elastic unit 252 arranged in and along the metallic tube 254, as shown in FIGS. 9, and 11.

From the above description, it can be easily understood that being capable of emitting light when rotating, the wheel cover of the present invention is relatively attractive, and can make lateral sides of an automobile easily noticeable to provide the automobile driver with more safety.

What is claimed is:

1. A wheel cover of an automobile, comprising:

a main body separably fitted to a wheel of an automobile, the main body being formed with a plurality of holding holes on an outward side thereof, the main body being formed with through lock holes extending from each holding hole to an inward side thereof;

a plurality of light emitting members, each light emitting member consisting of a circuit board, an electricity-activated light emitting element connected to an outward side of the circuit board, a conducting plate joined to the circuit board, and a vibration-activated switch fitted to the circuit board and capable of making the light emitting element activated with cells fitted to the conducting plate when making circular movement; and, the light emitting members being held in respective housings, which allow light thereof to traveling through, the housings being securely disposed in respective holding holes of the main body, each housing being formed with locking hooks which project from an inward end thereof, and which are passed through respective lock holes of the main body, and hooked onto the inward side of the main body;

whereby light can be emitted from the light emitting members when an automobile equipped with the wheel cover is driven.

2. The wheel cover of an automobile as claimed in claim 1, wherein each housing consists of a base part, and a covering part joined to the base part by means of screw threads; a ring-shaped pad being disposed between each pair of base part and covering part.

3. The wheel cover of an automobile as claimed in claim 1, wherein each housing is made of single part, and a ring-shaped pad is disposed between inward end of each housing and the main body.

4. The wheel cover of an automobile as claimed in claim 1, wherein each vibration-activated switch consists of a metallic tube and a metallic unit arranged in the metallic tube; the metallic elastic unit being capable of vibrating to come into contact with the metallic tube to make the light emitting member activated with the cells when the switch is making circular movement together with the wheel.

5. A wheel cover of an automobile, comprising:

a main body separably fitted to a wheel of an automobile, the main body being formed with a plurality of holding holes on an outward side thereof;

a plurality of light emitting members, each light emitting member consisting of a circuit board, an electricity-activated light emitting element connected to an outward side of the circuit board, a conducting plate joined to the circuit board, and a vibration-activated switch fitted to the circuit board and capable of making the light emitting element activated with cells fitted to the conducting plate when making circular movement, each vibration-activated switch consisting of an insulating tube, a metallic elastic unit arranged in the insulating tube, and a metallic conducting rod arranged in the unit so that the elastic unit will vibrate to come into contact with the conducting rod to make the light emitting member activated with the cells when the switch is making circular movement together with the wheel; and, the light emitting members being held in respective housings, which allow light thereof to traveling through, the housings being securely disposed in respective holding holes of the main body;

whereby light can be emitted from the light emitting members when an automobile equipped with the wheel cover is driven.

* * * * *